United States Patent [19]
Bauer

[11] Patent Number: 5,626,073
[45] Date of Patent: May 6, 1997

[54] TILTING MECHANISM

[75] Inventor: William A. Bauer, Chicago, Ill.

[73] Assignee: Savage Bros. Co., Elk Grove Village, Ill.

[21] Appl. No.: 655,622

[22] Filed: May 30, 1996

[51] Int. Cl.$^6$ .............................. A47J 27/00; B65G 3/04; B65G 65/23
[52] U.S. Cl. .................. 99/337; 99/348; 99/407; 99/409; 99/427; 99/492; 366/47; 366/185; 414/408; 414/420
[58] Field of Search ................ 99/326–334, 337, 99/338, 348, 427, 426, 403–410, 492, 485, 486; 366/47, 185; 414/406, 408, 420, 786

[56] References Cited

U.S. PATENT DOCUMENTS

| | | | |
|---|---|---|---|
| 2,251,903 | 8/1941 | Anstice et al. | 366/185 |
| 3,717,329 | 2/1973 | Margittai | 366/185 |
| 3,797,377 | 3/1974 | Lotter et al. | 99/407 |
| 3,954,052 | 5/1976 | Vegh et al. | 99/407 |
| 3,964,378 | 6/1976 | Dunkelman | 99/407 X |
| 4,173,925 | 11/1979 | Leon | 99/348 |
| 4,966,514 | 10/1990 | Knapp | 414/408 |
| 5,002,450 | 3/1991 | Naab | 414/420 X |
| 5,069,593 | 12/1991 | Zelinka et al. | 99/408 |
| 5,125,329 | 6/1992 | Tomatis | 99/453 |
| 5,176,069 | 1/1993 | Chen | 99/348 |
| 5,275,092 | 1/1994 | Fauteux | 99/409 X |
| 5,388,953 | 2/1995 | Habicht | 414/420 X |

*Primary Examiner*—Timothy F. Simone
*Attorney, Agent, or Firm*—Paul H. Gallagher

[57] ABSTRACT

A lift truck having horizontal arms straddling the kettle it is to lift, carry, and tilt. On the outer end of each arm is a tilting unit, one being a drive unit, and on the other an idler unit. These units grip the handles of the kettle. They are symmetrical, but otherwise identical. Each includes a swinging pendant latch, which yields on engaging the kettle handle, and then swings back into latching position. The units and the arms have interengaging elements preventing sliding of the kettle when it is in tilted position. A magnetic switch is included for shutting off the tilting driving motor when the movable parts are not in safe position.

10 Claims, 4 Drawing Sheets

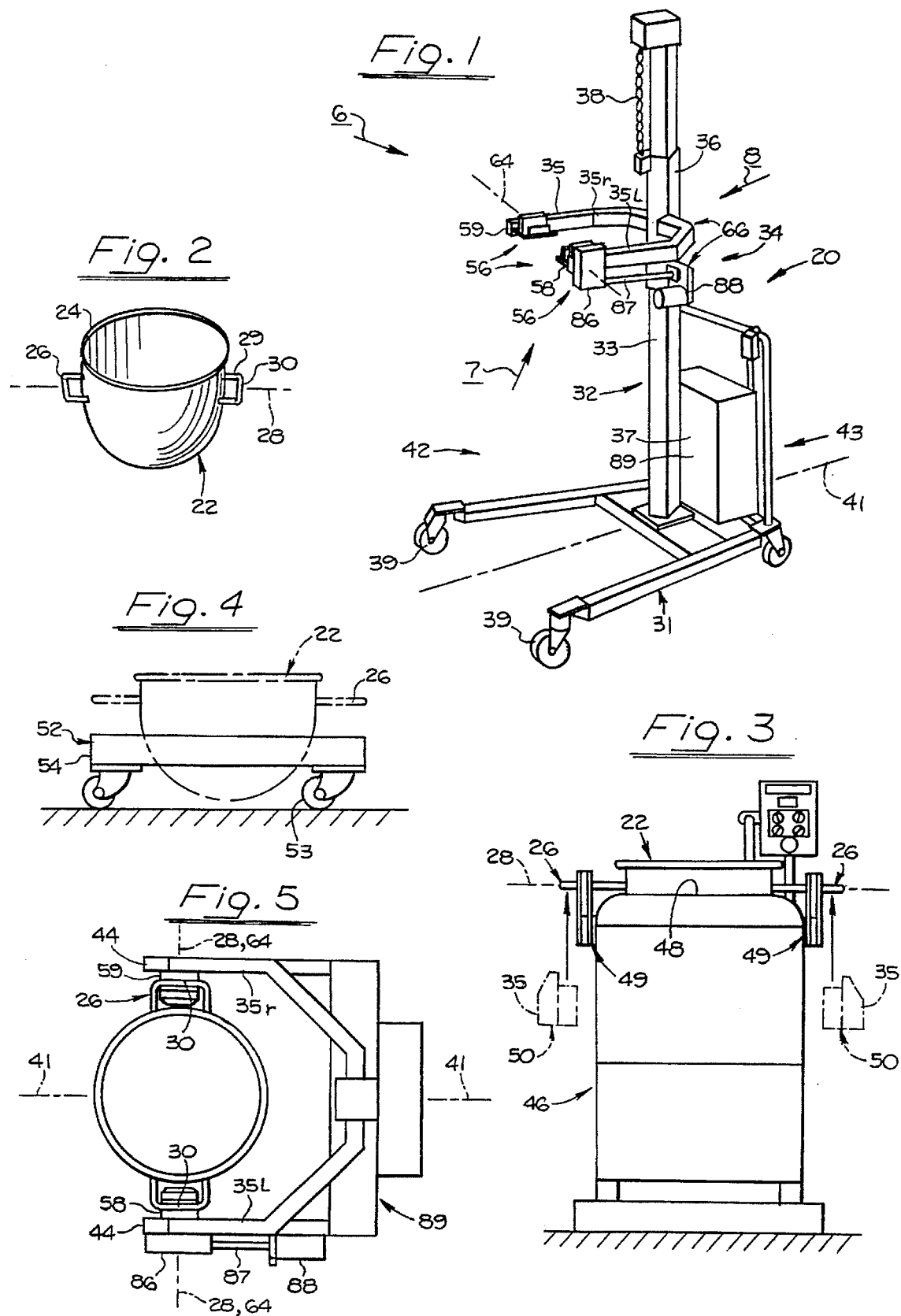

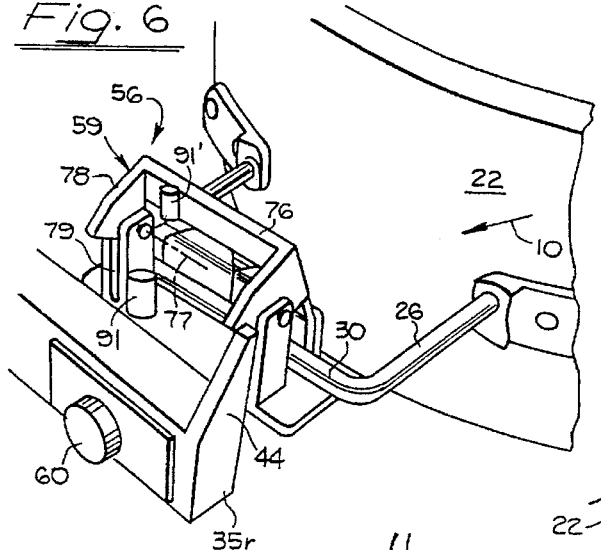
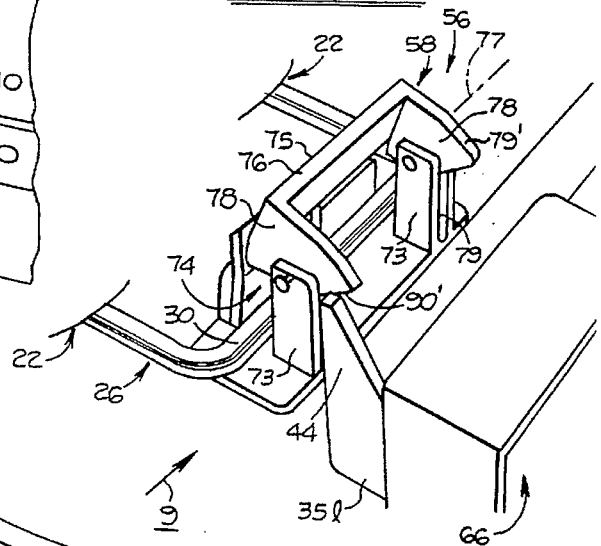
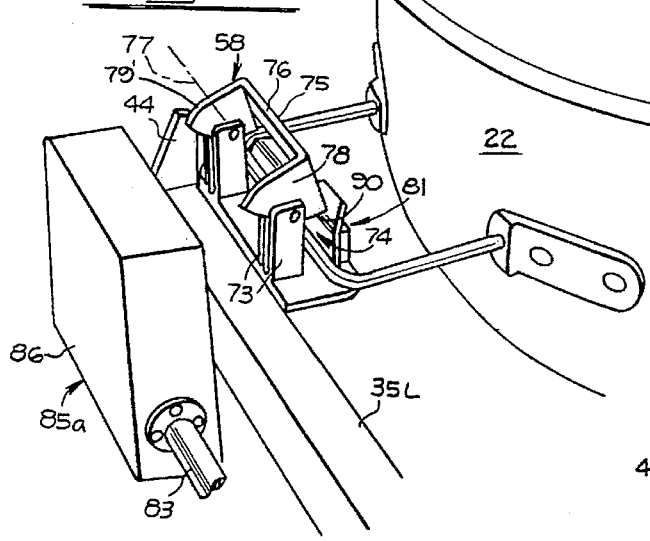
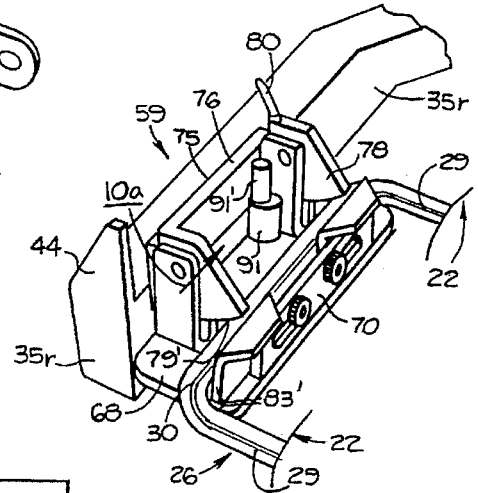
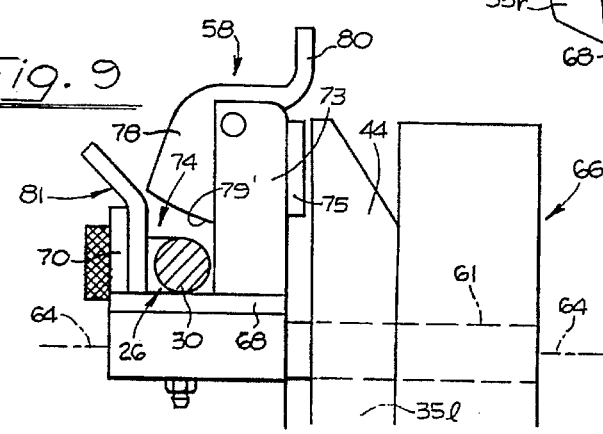
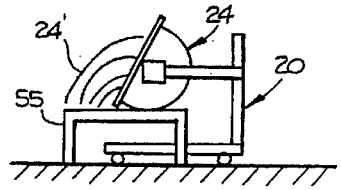

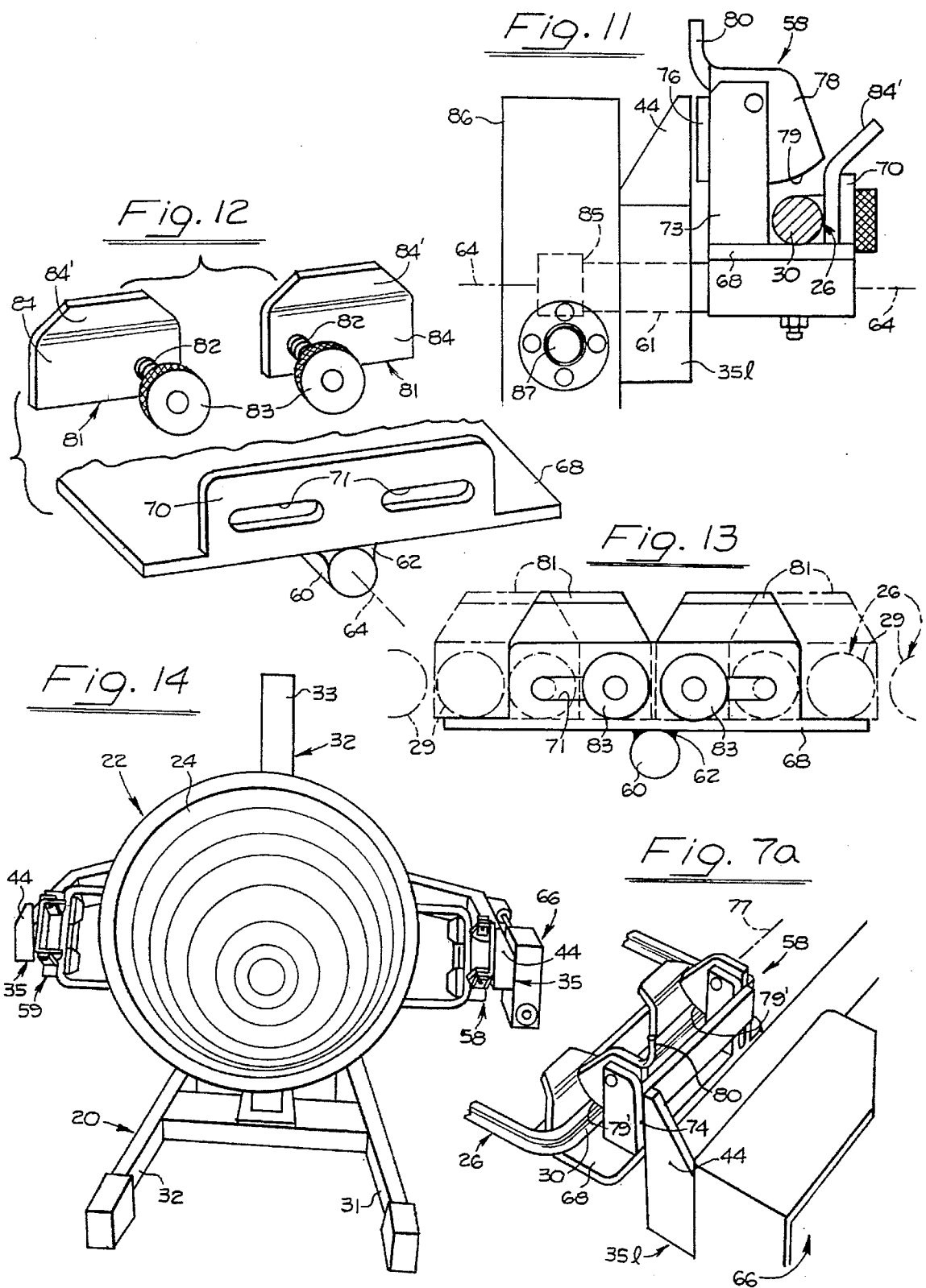

5,626,073

1

TILTING MECHANISM

SUMMARY OF THE INVENTION

The invention resides in the general field of machinery for use in making candy, and in baking, and similar uses. In this field a kettle is used for holding a batch of caramel or batter, or dough, and in the various steps and manipulations, the kettle is carried to and from various locations, end in certain of the steps the kettle is tilted or tipped to empty its contents.

The present invention has to do specifically with a tilting mechanism for so manipulating and tilting the kettle. A fork having two tilting units is mounted on a tilting truck, the tilting truck being utilized for carrying the kettle as mentioned, and the tilting units constitute the specific components for gripping the kettle and tilting it.

A main object is to provide a novel tilting mechanism for use in such tilting trucks for gripping, supporting, and tilting the kettle.

Another object is to provide such tilting units that are easily manipulable and controllable.

Still another object is to provide such tilting units in the use of which the kettle can be easily put in place and removed therefrom.

Another object is to provide such tilting units that are extremely simple in design and construction, and are very strong although of small and compact size.

Still another, and very important, object is to provide such tilting units- incorporating a great safety factor.

BRIEF DESCRIPTION OF THE INDIVIDUAL FIGURES OF THE DRAWINGS

FIG. 1 is perspective view of tilting truck embodying the features of the present invention.

FIG. 2 is a perspective view of a kettle for which the tilting mechanism is utilized.

FIG. 3 is a front view of a stove in which the kettle is placed for heating its contents, and indicating certain elements of the tilting mechanism.

FIG. 4 is a side view of a dolly in which the kettle is used, showing the kettle in dot-dash lines.

FIG. 5 is a top view of FIG. 3.

FIG. 5a is a semi-diagrammatic view showing tilting the kettle for emptying it.

FIG. 6 is a perspective view of the idler tilting unit and its supporting arm and a portion of the kettle, oriented according to the arrow 6 of FIG. 1.

FIG. 7 is a view similar to FIG. 6, of the drive unit, but taken from the opposite corner as indicated by the arrow 7 of FIG. 1.

FIG. 7a is a view similar to FIG. 7 but showing the tilting unit in closed position.

FIG. 8 is a perspective view of the drive unit, generally opposite that of FIG. 7, and oriented according to the arrow 8 of FIG. 1.

FIG. 9 is an end view of the drive unit shown in FIG. 7 as indicated by the arrow 9.

2

Figure 10A:
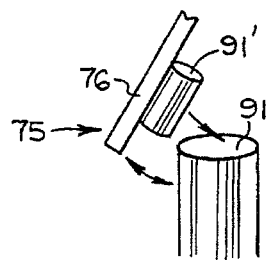
FIG. 10a is a view indicated by the arrow 10a of FIG. 10 but showing the latching unit tilted.
Figure 10B:
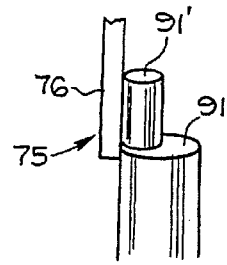
FIG. 10b is similar to FIG. 10a but with the latching unit in normal position.
Figure 10C:
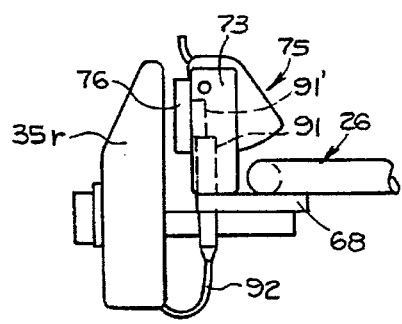
FIG. 10 is a perspective view showing the inner side of the idler tilting unit shown in FIG. 6 and oriented according to the arrow 10 of FIG. 6.

FIG. 10c includes the elements of FIGS. 10a and 10b and additional elements.

FIG. 11 is an end view opposite that of arrow 9 in FIG.

FIG. 12 is an exploded, perspective view of certain elements of the tilting unit.

FIG. 13 is a face view taken from the front of FIG. 12 with the elements in assembled position.

Figure 13A:
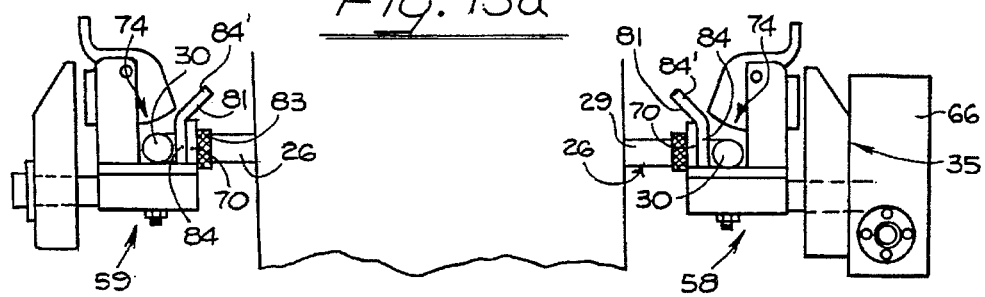

FIG. 13a is a fragmentary view from the front of the tilting truck showing both tilting units.

FIG. 14 is a face view of the tilting mechanism with a kettle therein, and with the kettle in a tilted position, approximately 60 degrees turned from its upper position.

Figure 15:
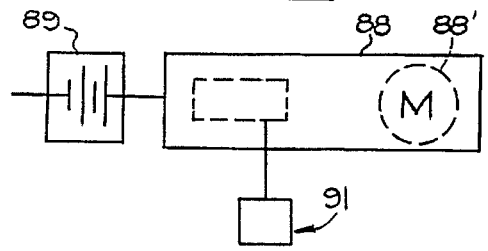

FIG. 15 is a fragment of the driving circuit.

Figure 16:
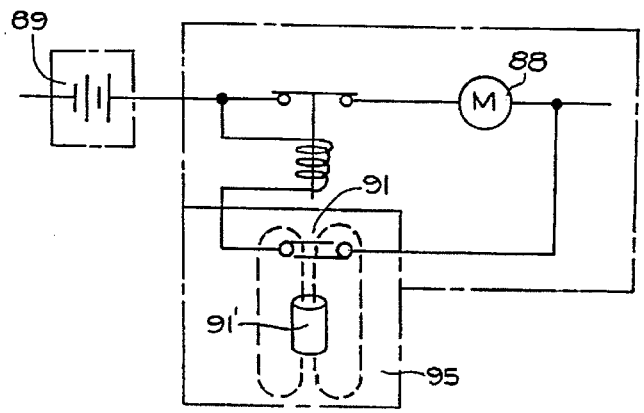

FIG. 16 is a diagrammatic view of a magnetic proximity switch and circuit.

DETAILED DESCRIPTION OF THE DRAWINGS

Referring in detail to the drawings, a tilting truck 20 is shown, on which the tilting mechanism is mounted. The tilting truck may also be referred to as a lift truck.

The kettle is shown in perspective at 22 (FIG. 2), which is a known item, heretofore used in the trade, having an open top 24, and handles 26. The content of the kettle is shown at 24' (FIG. 5a). The handles are of U shape, or loop form, and are positioned on opposite sides on a diameter of the kettle, indicated by the axis 28. Each handle includes side elements 29 secured directly to the kettle, and an outer element 30, the elements 30 being parallel to each other, and perpendicular to the axis 28. These elements 30 will be referred to again specifically in the description of the tilting mechanism.

The truck includes a base 31, a column assembly 32 which has a column 33, and a lift fork 34. The lift fork includes arms 35, and a sleeve 36 slidable on the column 33 for providing vertical movements of the lift fork, and hence the kettle. The fork is moved vertically under a control mechanism of known kind, indicated generally at 37, which may include a chain 38 (FIG. 1, top) generally in the column, but having an external end connected to the lift fork. The base 31 includes wheels or casters 39, enabling manual movement of the truck for carrying the kettle to different locations.

The tilting truck 20 is oriented according to a front-to-rear mediah line 41, indicating a front side 42 and a rear side 43. Thus the arms of the fork extend forwardly, being horizontal, and spaced apart horizontally, with their free outer ends reaching to and slightly past the axis 28 at the center of the kettle, when the kettle is mounted therein, as indicated above. The arms have upstanding lugs 44 (FIGS. 5–9) at their free ends forming limit stops in the tilting action, as referred to hereinbelow. The various parts of the truck are referred to as right and left as oriented according to the view of an operator at the rear of the truck. The arms are correspondingly identified 35l and 35r for left and right, respectively.

FIGS. 3–5 show the mounting and positioning of the kettle, in the various steps in its use. In FIG. 3, the kettle 22 is mounted on a stove 46 of known kind. The stove has an open top 48 through which the lower part of the kettle is inserted, and the handles 26 are placed on supports 49 on the stove which support the kettle. The handles 26 extend diametrically beyond the supports 49 and the elements 30 are positioned for gripping by the tilting mechanism. Elements of the gripping mechanism are shown diagrammatically at 50, and when these elements are raised, they grip the handles of the kettle, as described below.

FIG. 4 shows a dolly 52, of known kind, having casters 53. The dolly is basically in the form of a ring 54 in which the kettle 22 is placed, and thus the dolly with the kettle can be moved to various places. The arms of the tilting truck are capable of being positioned under the handles 26 of the kettle, on the dolly, and the kettle lifted and carried. The dolly in this case serves the purpose of intermediately moving the kettle to various places, and particularly to position it to enable gripping and lifting by the tilting truck.

In one step of handling the kettle, as indicated above, (FIG. 5a), it is carried to a table 55, and tilted, for emptying the contents 24' from the kettle onto the table.

Reference is next made to the tilting mechanism itself. The tilting mechanism is indicated in its entirety at 56 (FIG. 1) and includes a pair of tilting units 58, 59, mounted on the free ends of the arms 35, having a length direction longitudinally of the arms. The unit 58, mounted on the left arm 35l, is a drive unit, for producing the turning movement in the tilting step, while the unit 59, mounted on the right arm 35r, is an idler unit. These units are symmetrical, but otherwise nearly identical.

These two units 58, 59 include stub shafts 60, 61 by which they are mounted directly on the arms 35, the stub shafts extending through the arms. The stub shafts are rigidly secured at 62 (FIG. 12) to the under sides of base plates 68 of the units, the stub shafts being rotatable in the arms. They are so mounted with those stub shafts coaxial, on an axis 64 (FIG. 1), which, when the kettle is held in position by the arms, is parallel to the axis 28 (FIG. 2) of the kettle, and may be but not necessarily coincident therewith. The tilting units 58, 59, rotate or rock about the transverse axis 64 in the tilting step.

The tilting units 58, 59 and the arms 35 for convenience are referred to as having radially inner sides, directed toward the kettle, and radially outer sides directed oppositely therefrom.

The means for driving the drive tilting unit 58 is referred to generally at 66 (FIG. 1) and will be referred to again hereinbelow.

In the detailed description of the tilting units 58, 59, reference is first made to the drive tilting unit 58 (FIGS. 7, 7a, 8, 9, 11, 13a). Each unit includes the base plate 68 with an upstanding wall element 70 at its inner side, this wall element having a pair of longitudinally spaced and aligned slots 71.

At the outer side of the unit, are two pairs of spaced, vertical lugs or supports 73, the pairs being also spaced apart longitudinally. Between the wall element 70 and the vertical lugs 73 (FIG. 9) is a longitudinally extending space 74 for receiving the outer element 30 of the kettle handle, as explained further hereinbelow.

A double tab latch member 75 is pivotally swingable in the vertical lugs 73 on a longitudinal axis 77 (FIGS. 7, 8), also referred to as a third axis. This member includes a longitudinal back plate 76 and transverse latching tabs 78 positioned in the spaces 79 (FIG. 7) between the spaced vertical lugs 73. The latching tabs 78 have curved under surfaces 79' (FIGS. 7, 8, 9, 11). An upstanding pin 80 is provided on the latch member for manually swinging it, and for functioning as a stop means.

The latch member 75 is free rocking, and in the normal use thereof, it is moved by gravity to its latching position shown in FIGS. 7a, 9, 10, 10c, 11, 13a, 14.

On the inner surface of the wall element 70, are a pair of sliding plates 81 (FIG. 12) having threaded pins 82 extending through the slots 71 and provided with nuts 83. They are slidable longitudinally between an inner position (FIG. 13) shown in full lines, and an outer or extended position shown in dot-dash lines in that figure. These sliding plates are so adjustable for engagement, see 83' in FIG. 10, by the side elements 29 of the handles of the kettle to fit different sized handles, and particularly in the case of wide handles, that the handle elements engage the plates snugly and prevent shifting of the kettle, longitudinally of the arms 35.

Each slide plate 81 includes (FIG. 12) a lower vertical portion 84 that is fitted against the corresponding wall element 70, and an upper tab 84' at an angle, e.g. of 45', from the lower portion. These slide plates, at right and left positions, are mounted (FIG. 13a) in mutually upwardly converging orientation to provide double and opposite camming effect to guide the elements 30 of the handles on the kettle into the spaces 74 (FIGS. 7a, 13a), and thus into the titling units; compare FIG. 5. The slide plates 81 and the vertical lugs 73 define the space 74 referred to above.

For the purpose of tilting the kettle, the stub shaft 61 at the left (FIG. 11) is provided with a gear 85 for connection with driving means referred to below.

As shown in FIGS. 1, 5, 8, a gear box 86 is mounted on the outer surface of the arm 35l and has operable connection with the gear 85 (FIG. 11). It includes a shaft 87 (FIG. 1) leading to a unit 88 having an electric drive motor 88' (FIG. 15) for driving the gear means and thus, through the shaft, rotating and tilting the kettle. The unit 88 provides a safety feature being operable upon excessive rise in motor current to cause a circuit interrupter to actuate, this component being of known kind In the practical operation of the tilting truck, and tilting mechanism, an example of a position and setting is assumed as represented in FIG. 3. In this case the kettle is in position on the stove 46, with the handles 26 extending radially or transversely beyond the sides of the stove, as referred to above. To remove the kettle from the stove, the tilting truck is moved up to the stove, with the arms of the fork straddling the stove to a position in which the free ends of the arms are under the handles of the kettle, as represented diagrammatically in FIG. 5, as noted. Then the fork is raised and the outer elements 30 of the handles move, relatively speaking, downwardly into the spaces 74. In FIG. 5, the details of the latching elements of the tilting units 58, 59 are omitted, for convenience, the tilting units thereby appearing simply as hooks, facilitating the showing of their function.

In a continuation of this movement, the latching step of the tilting units 58, 59 takes place; specifically the elements 30 of the handles engage the latching tabs 78 (FIGS. 9–11), rotating them and thus the latch members 75, in corresponding opposite directions; in FIG. 10 that direction is clockwise, the elements 30 engaging the base plates 68, after which the latch members 75 rock in the opposite direction, under the action of gravity (FIG. 11). In this step, each back plate 76 engages the vertical lugs 73, the latter thus forming a limit stop. The handles of the kettle are thus held down by the latch members; any upward movement of the handle, and engagement with the latch tabs tends to rotate the latch member about the axis 79 in the opposite direction, but such rotation is prohibited by the engagement of the back plate with the vertical lugs 73.

The handles 26 of various kettles may not all be of the same width, and it is preferred that the handles be snubbed to prevent shifting of the kettle in directions along the length of the outer element 30. For this purpose the adjusting slides 81 (FIGS. 12, 13) are provided, which can be moved to an outer position in the case of wide handles, while if the handles are narrow, they can be adjusted inwardly to a corresponding position.

With the kettle so positioned, i.e., with the handles gripped in the tilting units, the drive force is established. In this step, through the action of the drive motor 88' in the unit 88 (FIG. 15), and gear means 86, the drive unit 58 is positively rotated about the axis 64 of the stub shafts 60, 61 (FIGS. 1, 5, 11). Thereupon the kettle is tilted on that axis, and it produces a corresponding tilting or rotating movement of the idler unit 59.

In this tilting movement, the weight of the kettle and the contents thereof hold the handles in position in the tilting units, but as the tilting is increased, the kettle tends to slide along the tilting units, i.e., along the length of the outer elements 30 of the handles, but this movement is checked or limited by the corresponding sliding plates 81. Upon still further tilting movement, the result is an upward movement of the corresponding end of the handle, in such direction as would throw it out of the tilting units, but the latching tabs 78 are engaged by the handle, and the kettle is held against so falling out.

After the tilting step is performed, and the kettle is emptied (FIG. 5a) and returned to its upright or normal position, the next step may be to remove the kettle from the tilting truck. To release the handles of the kettle for this purpose, the latch members 75 are manually swung to the position shown in FIG. 8. To do this, the operator grips the pins 80 and throws the members inwardly until the pins engage the slide plates 81. These latch members 75 in this position are free of locking effect, and as the handle of the kettle is raised (FIG. 8) it engages the latching elements at point 90, and swings the latch members in the opposite direction, i.e., counterclockwise. The latch member is held in the position shown, by gravity, the member having been thrown over to such effective position. The position of the latching elements 75 in this figure may be referred to as a releasing or open position.

If the latch members 75 (FIG. 8) should unintentionally or accidentally be left in open position, and an attempt be made to tilt the kettle, the latch member 75 is so shaped and constructed that it would engage the safety lug 44 (FIG. 7) on the arm 35l at point 90' and the driving force of the motor 88' (FIG. 1) thereby obstructed by the unit 44 as referred to above. The operator may then manually swing the members 75 back to the proper position. The stoppage would occur if the latch members were not in full open position, but accidentally caught in a partially open position.

Another safety feature is incorporated in the mechanism. A magnetic proximity switch 91 is utilized in the idler unit 59 (FIG. 10), mounted on and perpendicular to the plate 68. Mounted on the back plate 76 is a magnet 91', and when the latch member 75 is in locking position (FIG. 10b), the magnet is in proximity to the end of the switch, and a cable 92 (FIG. 10c) leads to the control unit 88 (FIGS. 1, 15). The magnet establishes a magnetic field 95 (FIG. 16), closing the switch to the drive motor. When the magnet is moved out of that position (FIG. 10a), by moving the member 75, the magnetic field is destroyed and the circuit opened to the drive motor. Accordingly, the drive motor can operate only when the latch member 75 is in proper locking position (FIGS. 10, 10b).

I claim:

1. Apparatus for handling an open top kettle or bowl having loop handles on opposite sides, on a diameter of the kettle, each with an elongated horizontal outer element perpendicular to said diameter, the kettle holding a content of caramel or batter, said apparatus being operable for tilting the kettle for emptying the content therefrom, said apparatus comprising,
a stand,
a lift truck having a vertically movable fork mounted thereon, the fork having horizontally spaced arms which in operation straddle the kettle or bowl and extend to a working position where their free ends are adjacent to the middle of the kettle at said diameter,
a tilting unit on the extended end of each arm,
each tilting unit including a double tab latching member having latching elements spaced along the length of the outer element of the handle, and
the tilting units being operable for receiving the corresponding outer elements of the handles, and the latching elements being operable for gripping said outer element,
one of the tilting units being a drive unit and the other being an idler unit, and
the drive unit in cooperation with the idler unit being operable for rotating on a transverse axis adjacent said kettle diameter for tilting the kettle.

2. Apparatus according to claim 1 wherein,
each tilting unit includes a bottom plate engaged by the handle of the kettle in supported position, and has diametrically spaced upright elements confining the handle against movement in directions along its said kettle axis,
said double tab latching member is swingable on a third axis parallel with said outer element of the handles and normally held in a downward position under the action of gravity, and
the latching member being yieldable to movement of the handle element downwardly between said upright elements, and the latching member being cooperative with one of said upright elements for latching the handle element in its said supported position.

3. Apparatus according to claim 2 wherein,
the arms and the units have inner surfaces directed toward each other in diametrical direction and outer surfaces directed diametrically outwardly,
the arms have upwardly directed safety lugs,
the latching members having a downward position in which the units are entirely inwardly of the arms and they are rotatable on their said third axes clear of arms, and
when either latching member is out of its said downward position it is partially in line circumferentially with the corresponding safety lug and it is blockingly engaged by the safety lug, and the unit, and thereby the kettle, is blocked from tilting movement.

4. Apparatus according to claim 1, wherein the handles of the kettle also have side elements, and wherein,
each tilting unit includes spacer elements on each inner upright element engageable by said side elements of the handles, and
means is included for mounting said spacer elements for adjustment in the direction of said third axis, to accommodate different spacings of side elements of the handles on different kettles.

5. Apparatus according to claim 1 wherein,
the arms and units on the opposite sides of the kettle have inner surfaces directed diametrically toward each other and outer surfaces directed diametrically outwardly, the units include stub shafts secured at their inner ends to the bottom plates and pivotally mounted at their outer ends in the arms, and the stub shafts are mutually aligned on their said axis.

6. Apparatus according to claim 2 wherein, the latching members, when in their normal pending position yield to the handles as the latter engage them and move downwardly therepast, and they block the handles from moving upwardly from their supported positions, and the latching members are so constructed and so mounted on one of said upright elements that in their normal positions they are gravity-held against the upright elements, in stable condition.

7. Apparatus according to claim 3 and including, said latching member when in latching position being out of the vertical projection of the arm, electrical motor means for driving the drive tilting unit, a magnetic proximity switch for controlling the electrical motor, said switch means being mounted on the idler unit, a magnet on the latching member, and when the latter is in latching position, the magnet being closely adjacent said switch and thereby energizing and closing the switch and driving relationship between the motor and the drive unit, when the latching member is out of latching position, the magnet being moved to a remote position relative to said switch and thereby interrupting the driving relationship between the motor and the drive unit.

8. Apparatus according to claim 1 wherein, the latching member is manually swingable to an over-center stable unlatching position, wherein it is engaged by the handle on the kettle when the kettle is removed from the tilting unit and the handle is thereby swung into latching position which is also a yielding position.

9. Apparatus according to claim 8 and including an electrical driving motor mounted on the arm bearing the drive tilting unit, a gear box is also mounted on that same arm, and operably interconnecting the motor and the drive unit, and a battery mounted on the lift truck for energizing the electrical motor.

10. Apparatus according to claim 3 wherein, the electric circuitry of the motor includes a unit operably responsive to excessive rise in motor current to stop the motor.

\* \* \* \* \*